(12) United States Patent
Orth et al.

(10) Patent No.: US 11,772,891 B2
(45) Date of Patent: Oct. 3, 2023

(54) PIECE GOODS BOX AND METHOD FOR TRANSFERRING AND STORING PIECE GOODS IN A PIECE GOODS BOX

(71) Applicants: Felix Orth, Aachen (DE); Fabian Schmitt, Eynatten (BE); Daniel Voiges, Aachen (DE)

(72) Inventors: Felix Orth, Aachen (DE); Fabian Schmitt, Eynatten (BE); Daniel Voiges, Aachen (DE)

(73) Assignee: STREETSCOOTER GMBH, Aachen (DE)

( * ) Notice: Subject to any disclaimer, the term of this patent is extended or adjusted under 35 U.S.C. 154(b) by 369 days.

(21) Appl. No.: 15/937,322

(22) Filed: Mar. 27, 2018

(65) Prior Publication Data
US 2018/0282061 A1    Oct. 4, 2018

(30) Foreign Application Priority Data

Mar. 28, 2017    (DE) ..................... 10 2017 106 602.0

(51) Int. Cl.
*A47B 96/16*    (2006.01)
*B65G 1/04*    (2006.01)
(Continued)

(52) U.S. Cl.
CPC ................ *B65G 1/04* (2013.01); *A47B 96/16* (2013.01); *B60P 1/4471* (2013.01); *B60P 3/007* (2013.01); *G07F 11/60* (2013.01)

(58) Field of Classification Search
CPC ......... B65G 1/04; A47B 96/16; B60P 1/4471; B60P 3/007; G07F 11/60
(Continued)

(56) References Cited

U.S. PATENT DOCUMENTS 338,194 A * 12/1906 Larsh
838,194 A   12/1906 Larsh
(Continued)

FOREIGN PATENT DOCUMENTS

CN    201176380 Y    1/2009
CN    205275142 U    6/2016
(Continued)

OTHER PUBLICATIONS

Garrett Hack, How to Break an Edge, Oct. 2011, Fine Woodworking, Fine Woodworking #221, finewoodworking.com/2011/07/28/how-to-break-an-edge (Year: 2011).*

(Continued)

*Primary Examiner* — Daniel J Troy
*Assistant Examiner* — Timothy M Ayres
(74) *Attorney, Agent, or Firm* — Reinhart Boerner Van Deuren P.C.

(57) ABSTRACT

Disclosed is a piece goods box having at least one piece goods chamber for receiving at least one piece goods item. The at least one piece goods chamber is assigned at least one holder that is adjustable from a storage position to a transfer position in which the holder is disposed at least partially outside the piece goods chamber, for transferring the piece goods item to/from the piece goods box. The holder, in the transfer position, has two holding regions for holding the at least one piece goods item in the transfer position. In the transfer position, at least one free space is provided between the holding regions of the at least one holder that is accessible in the horizontal direction from outside the at least one piece goods chamber.

15 Claims, 11 Drawing Sheets

(51) Int. Cl.
*G07F 11/60* (2006.01)
*B60P 1/44* (2006.01)
*B60P 3/00* (2006.01)

(58) Field of Classification Search
USPC .................................................. 312/330.1
See application file for complete search history.

(56) References Cited

U.S. PATENT DOCUMENTS

| | | | | | |
|---|---|---|---|---|---|
| 1,050,252 | A | * | 1/1913 | Thorson | A47G 29/121 232/33 |
| 1,220,251 | A | * | 3/1917 | Martin | A47G 29/12097 232/33 |
| 1,728,946 | A | * | 9/1929 | Tobey | A47B 63/02 312/301 |
| 1,993,477 | A | * | 3/1935 | Gourley | A47B 63/02 312/301 |
| 2,361,525 | A | * | 10/1944 | Ball | A47B 96/16 312/274 |
| 2,405,668 | A | * | 8/1946 | Paxton | A47B 96/16 312/273 |
| 2,814,545 | A | * | 11/1957 | Cornish | A47B 96/16 312/271 |
| 2,872,267 | A | * | 2/1959 | Machingo | A47B 96/16 312/273 |
| 3,200,983 | A | * | 8/1965 | Walter | A47B 88/90 220/533 |
| 3,212,835 | A | * | 10/1965 | Beckett | F25D 25/022 312/311 |
| 3,462,208 | A | * | 8/1969 | Pittman | A47B 88/9414 312/352 |
| 3,582,174 | A | * | 6/1971 | Riley | A47B 88/906 312/334.28 |
| 3,890,024 | A | * | 6/1975 | Noneman | A47B 88/906 312/334.28 |
| 4,174,034 | A | * | 11/1979 | Hoo | B65D 11/12 206/1.5 |
| 4,190,004 | A | * | 2/1980 | Richardson | E05G 7/008 109/19 |
| 5,211,461 | A | * | 5/1993 | Teufel | A47B 88/407 312/334.4 |
| 5,588,729 | A | * | 12/1996 | Berger | A47B 88/427 312/330.1 |
| 5,802,991 | A | * | 9/1998 | Brown | E05G 7/008 109/19 |
| 6,789,860 | B1 | | 9/2004 | DePietro et al. | |
| 7,004,380 | B2 | * | 2/2006 | Gunvaldson | A47G 29/12097 232/29 |
| 7,210,616 | B1 | * | 5/2007 | Van Watermulen | A47G 29/12097 232/29 |
| 2009/0322194 | A1 | * | 12/2009 | Backhaus | A47B 96/16 312/326 |
| 2017/0024687 | A1 | | 1/2017 | Wiechers | |
| 2017/0340109 | A1 | * | 11/2017 | Chen | A47B 88/403 |

FOREIGN PATENT DOCUMENTS

| | | |
|---|---|---|
| DE | 43 35 742 A1 | 4/1995 |
| DE | 297 24 713 U1 | 4/2003 |
| DE | 103 12 127 A1 | 10/2004 |
| DE | 20 2008 011 335 U1 | 11/2008 |
| EP | 2 138 071 A1 | 12/2009 |
| EP | 2636339 A1 * 9/2013 ........... A47B 88/427 |
| GB | 725757 A | 3/1955 |
| WO | WO 92/20259 A1 | 11/1992 |

OTHER PUBLICATIONS

Willenbrockshop, Mehr als Staplerzubehör, Willenbrock Fördertechnik GmbH & Co. KG, Jan. 1, 2017, 32 pages URL: http://www.willenbrock.de/media/Media-Willenbrock/05-Media/WillenbrockShop/WillenbrockShop-Katalog-2017-Ansicht.pdf.

Xiao, Yuanzhen, "The Development and Selection of High-tech Household Appliances." Shanghai Science and Technology Publishing House, Jul. 1992, pp. 252-253, ISBN: 7-5323-2704-3.

Wu et al., *China Pallet Handbook*, Edition 2, China's Wealth Press, Nov. 2014, pp. 408-411.

* cited by examiner

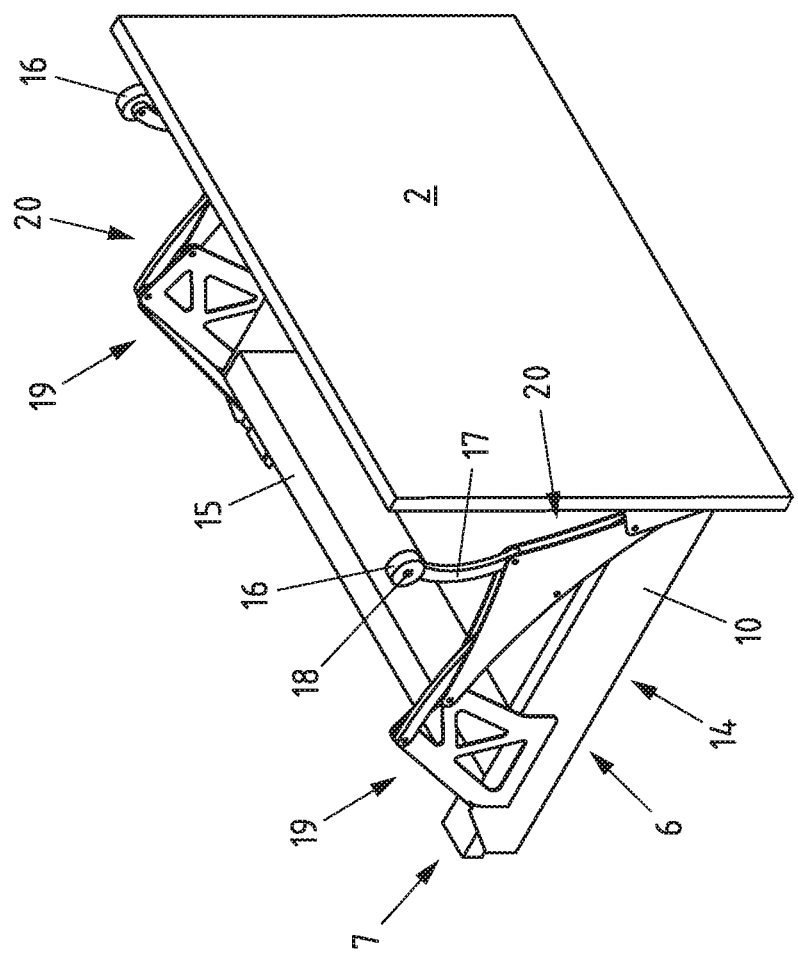

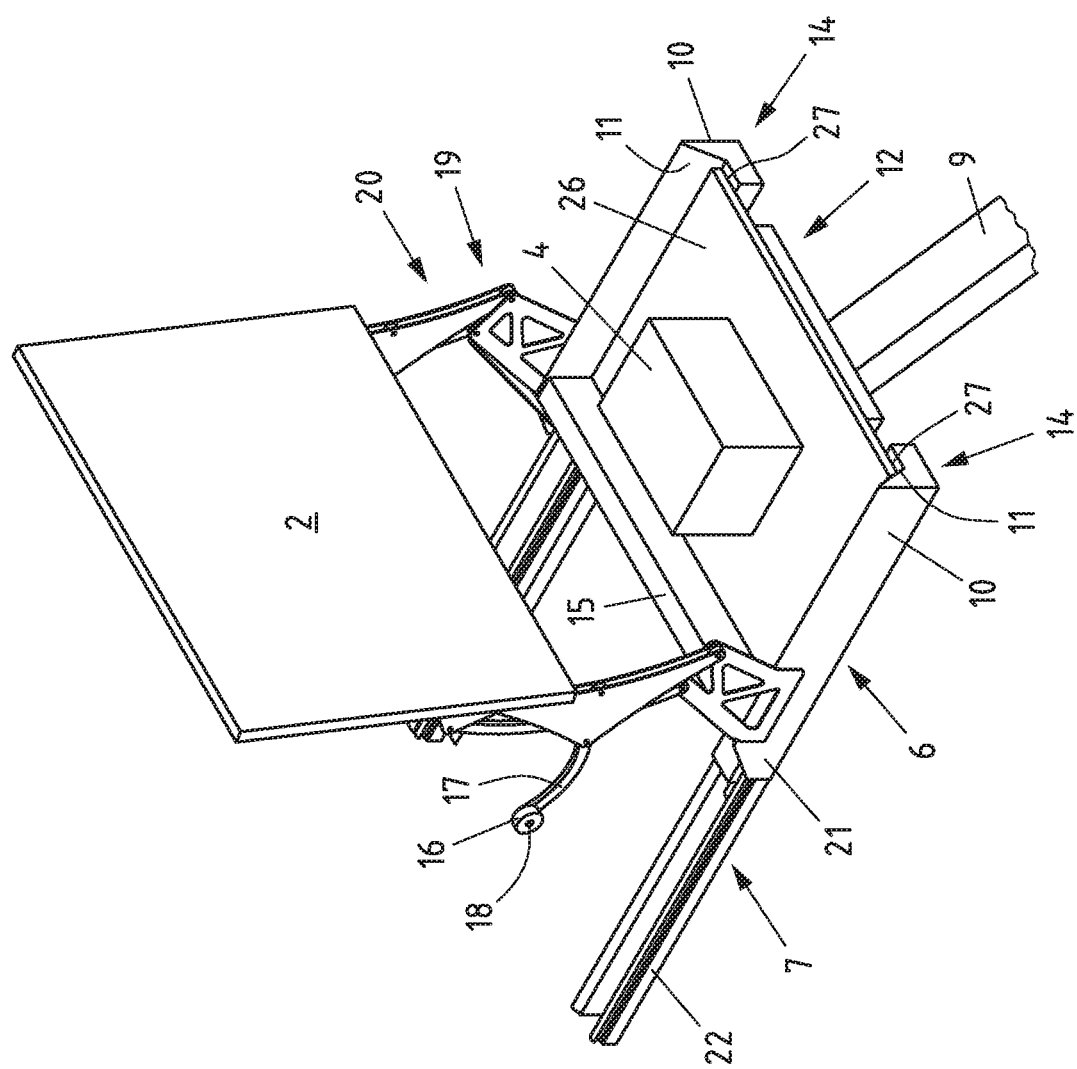

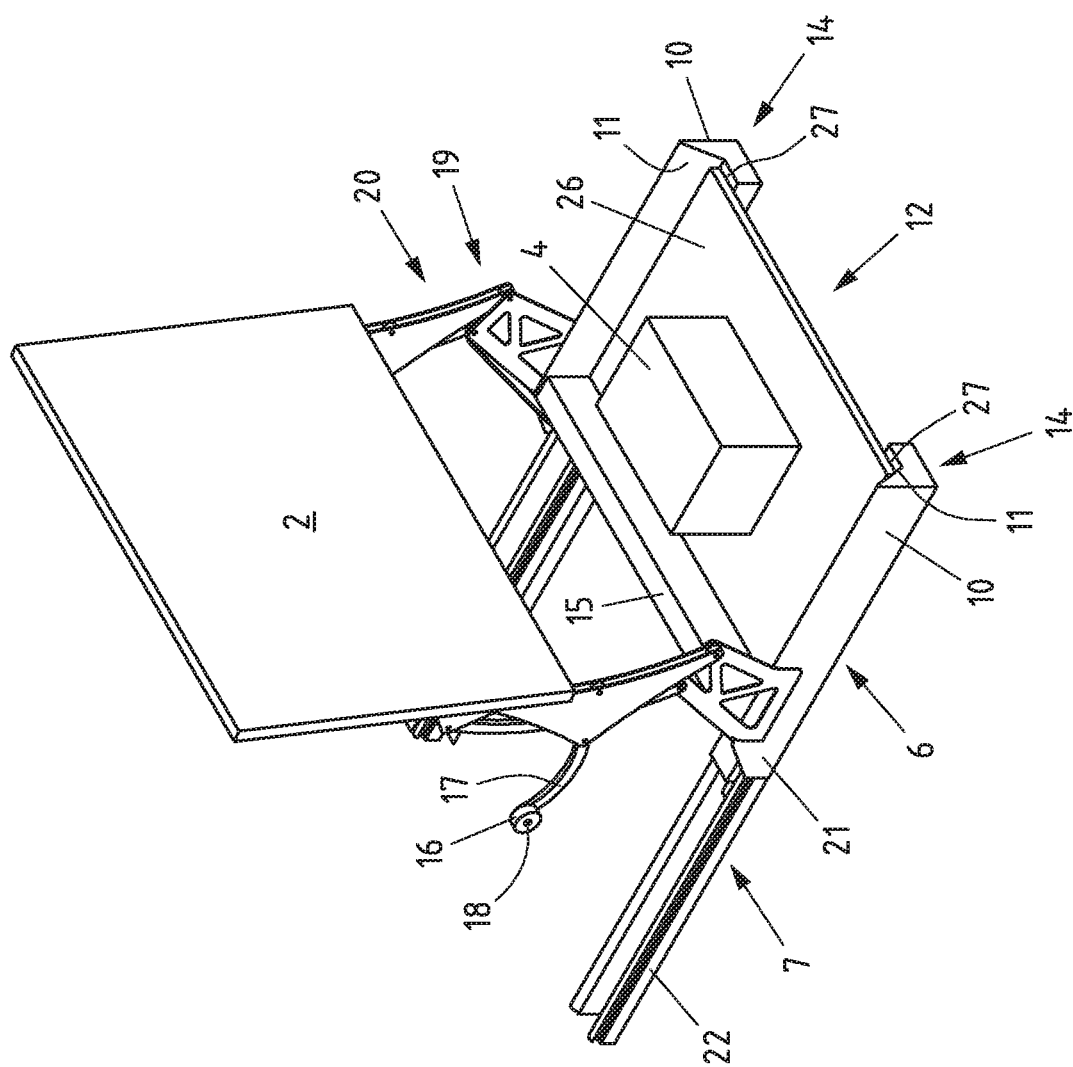

PIECE GOODS BOX AND METHOD FOR TRANSFERRING AND STORING PIECE GOODS IN A PIECE GOODS BOX

CROSS-REFERENCE TO RELATED PATENT APPLICATION

This patent application claims priority to German Application No. 10 2017 106 602.0, filed Mar. 28, 2017, the entire teachings and disclosure of which are incorporated herein by reference thereto.

FIELD OF THE INVENTION

The invention relates to a piece goods box, having at least one piece goods chamber for receiving at least one piece goods item, wherein the at least one piece goods chamber is assigned at least one holder that from a storage position for storing the at least one piece goods item in the piece goods chamber is adjustable to a transfer position, disposed at least partially outside the piece goods chamber, for transferring the piece goods item from the piece goods box and/or to the piece goods box, and wherein the holder at least in the transfer position has two, in particular lateral, holding regions for holding at least indirectly the at least one piece goods item at least in the transfer position. The invention furthermore relates to a method for transferring and storing piece goods in such a piece goods box.

BACKGROUND OF THE INVENTION

Piece goods boxes having at least one piece goods chamber for receiving at least one piece goods item are already known in various design embodiments. In order for a piece goods item to be placed into a piece goods chamber of a piece goods box, or in order for a piece goods item to be removed from a piece goods chamber of a piece goods box, the respective piece goods chamber is opened by a user who subsequently manually places a piece goods item into the piece goods chamber or removes said piece goods item from the piece goods chamber.

Piece goods boxes having drawers which are pushed into a piece goods chamber or are pulled out of a piece goods chamber are also known in individual cases, said drawers thus being able to be utilized as holders. The drawers, when pushed into the piece goods box, are located in a storage position in which the piece goods item can be stored in the drawers. The drawers, when pulled out of the piece goods box, are located in a transfer position which allows the user to place the piece goods item into the drawers or to remove said piece goods item from the drawers. The base of the drawers that extends across the entire width of said drawers forms a holding region which can hold directly or indirectly the piece goods, depending on whether the piece goods item is placed individually into the draw or placed into the draw on a support.

In this context there are efforts toward designing the handling of the piece goods more efficiently and more cost-effectively. Here, as in other sectors, the personnel costs represent a significant cost factor. Said personnel costs however cannot be reduced or readily reduced. To this end it would be necessary for the personnel to be relieved of activities. However, specific activities can hardly be dispensed with. To date, it has also not been successful to have specific activities performed by machines instead of personnel. The technical complexity associated herewith is indeed so enormous that the overall efficiency of the handling of piece goods cannot be increased or significantly increased unless significant allowances are to be simultaneously accepted in terms of reliability and promptness.

The present invention is therefore based on the object of designing and refining the piece goods box and the method of in each case the type mentioned at the outset and explained in more detail above in such a manner that the handling of piece goods for placing, temporarily storing, and removing piece goods in piece goods chambers of piece goods boxes can be carried out in a more efficient and more cost-effective manner.

BRIEF SUMMARY OF THE INVENTION

This object in the case of a piece goods box according to exemplary embodiments disclosed herein is achieved in that in the transfer position between the holding regions of the at least one holder at least one free space that is accessible in the horizontal direction from outside the at least one piece goods chamber and is disposed outside the piece goods chamber is provided.

The object mentioned is moreover achieved according to embodiments of a method for transferring and storing piece goods in a piece goods box, preferably according to one of the embodiments of a piece goods box disclosed herein,
  in which at least one holder that is assigned to at least one piece goods chamber is adjusted from a storage position for storing at least one piece goods item in the piece goods chamber to a transfer position, disposed at least partially outside the piece goods chamber, for transferring the at least one piece goods item from the piece goods box and/or to the piece goods box;
  in which in the transfer position of the holder at least one transfer device preferably in an at least largely vertical movement is moved from outside the at least one piece goods chamber at least partially through a free space between two, in particular lateral, holder regions of the holder for at least holding indirectly the at least one piece goods item; and
  in which when moving the transfer device through the free space of the holder at least one piece goods item is transferred to the holder in the transfer position, and/or at least one piece goods item is acquired by the holder in the transfer position.

On account of the design embodiment of the holder having at least two holding regions, a free space that is disposed outside the piece goods chamber being disposed therebetween, the transfer and/or the acquisition of a piece goods item to the piece goods chamber and/or from the piece goods chamber can be performed in a mechanized manner. An operator is thus no longer mandatorily required for this purpose. The mechanized transfer and/or acquisition of a piece goods item can be performed by means of a transfer device which can be moved through the free space when the piece goods item is being transferred or acquired. The transfer device herein is preferably configured in a manner similar to that of an arm which can support directly or indirectly a piece goods item. When the transfer device carries directly the item of piece goods, the piece goods item bears on the transfer device, for example, while the transfer device carries only indirectly the piece goods item when the transfer device supports a tray or a container on which, or in which, respectively, the piece goods item is placed.

For example, when a piece goods item, a tray, or a container is held by the holder, the transfer device can take the consignment, the tray, or the container from the holder so as to transport the consignment in a vehicle, for example, and to temporarily store said consignment in the latter. In this case, it will be preferable for the transfer device to be moved, in particular pivoted, from bottom to top through the free space between the holding regions. The consignment, the tray, or the container can then as required be acquired by the transfer device in a form-fitting manner, in particular in the direction of gravity, for instance in order for the consignment, the tray, or the container to be transferred to a vehicle. The consignment can thus be stored in the piece goods chamber, for example, until a vehicle arrives to acquire the consignment and to subsequently carry said consignment. The consignment can then be delivered in the desired manner at another location.

However, it can also be provided that a piece goods item which is dropped off as required by a vehicle is transferred to the piece goods chamber and herein is also delivered as required. The transfer device then will hold a piece goods item, a tray, or a container, and in particular be moved from top to bottom through the free space between the holding regions of the holder. A form-fit at least in the direction of gravity is created in this way between the consignment, the tray or the consignment, such that the latter is lifted by the transfer device. In other words, the transfer device can be pulled downward through the free space and herein leave behind the consignment with or without a tray or container.

In order for the handling of a piece goods item to be further simplified, the transfer device can be fitted to a vehicle. The transfer device, like the piece goods that are acquired and/or to be transferred are then carried by the vehicle. The transfer device, independently thereof, can also be activated from the vehicle, either in a manual or automated manner. It is thus no longer necessary, for example, for an operator to alight from the vehicle and to place the piece goods item into the piece goods box by hand and/or to remove said piece goods item from the piece goods box by hand. This can be accomplished, for example, by the driver of the vehicle with the aid of the transfer device, without the driver herein having to leave the vehicle.

The term vehicle can presently be understood in a very wide sense. For the sake of simplicity, motor-driven vehicles are preferably indeed considered; however, vehicles that are not motor driven and which are moved by hand, for example, or by another motor-driven vehicle, are also considered. In particular in the case of motor-driven vehicles, the latter can be driven or controlled, respectively, by a driver. However, said vehicles can also be fully or partially autonomous vehicles which can fully or partially dispense with a driver. In this case, for example, so-called land drones which are unmanned autonomous land vehicles are expedient. Said land drones can be very much smaller than manned land vehicles, this however not being a requirement.

Piece goods are presently understood to be in principle objects which can be transported in one piece and specifically with a manageable complexity. Piece goods are thus preferably individual objects. However, a piece goods item can also be understood to be a packaging unit, for example a crate, a loaded pallet, a roll, or a keg. A container which contains a bulk product, a liquid product, or gas is likewise a piece goods item. A piece goods item can furthermore likewise be a specific product or a packaging unit, as well as un unpackaged product or packaging unit. Repackaged goods or piece goods, respectively, herein are also referred to as packed items.

In terms of the size and the weight of piece goods, there are typically upper limits where, as a result of the size and/or of the weight of the piece goods item, the piece goods item can no longer be readily transported. This presently in particular can be piece goods of a maximum dimension of less than 3 m, preferably less than 2 m, in particular less than 1 m, and/or of a maximum volume of less than 2 $m^3$, preferably less than 1 $m^3$, in particular less than 0.5 $m^3$. An upper limit of the weight can furthermore be 100 kg, preferably 10 kg, in particular 1 kg.

The piece goods can be, for example, items for daily consumption such as consumables or foodstuffs or technical items and apparatuses. Furthermore, piece goods can also be consignments which are typically handed over to specific consignees at specific locations, are left behind for specific consignees, or are delivered to specific consignees. Preferably, consignments will typically represent comparatively small and light piece goods. Consignments can thus be distributed, for example, by a parcel service, an express delivery service, or a courier service. Moreover, consignments are often packaged items, thus packed piece goods. The consignments herein are preferably letter consignments, parcel consignments, and/or printed matter. Packet consignments herein also comprise small parcels, while printed matter can also include catalogues, brochures, and periodicals. Apart from letters, postcards are also part of the letter consignments.

Against this background, the piece goods box for transferring and storing piece goods is preferably a consignment box for transferring and storing consignments. Such a consignment box moreover preferably has consignment chambers for receiving at least one consignment. The invention can consequently deliver the advantages thereof in particular in the context with the handling of consignments, wherein presently consignments can be understood to be all possible types of piece goods. In many cases, the consignments are consignments which are to be delivered by a postal service and which can be referred to as mail consignments. Alternatively or additionally, the handling of the consignments can also be performed by at least one parcel service, express delivery service, or courier service.

As required, the consignments are letter consignments, parcel consignments and/or printed matter. Packet consignments herein also comprise small parcels, while printed matter can also include catalogues, brochures, and periodicals. In addition, a letter consignment can, apart from a letter, also be a postcard.

For the sake of improved understanding, and in order to avoid unnecessary repetitions, the piece goods box and the method, in each case of the type mentioned at the outset, are explained collectively without a differentiation being made in each individual case between the piece goods box and the method. However, a person skilled in the art will be aware in each case by means of the context as to which feature is preferable in terms of the piece goods box and of the method, respectively.

In the case of a first particularly preferred design embodiment of the piece goods box, the at least one free space is provided on a front side of the piece goods box. The at least partial penetration of the free space by the transfer device is thus facilitated, specifically when the transfer device is fitted to a vehicle. The at least one piece goods item can moreover be readily removed from the front side of the piece goods box from the piece goods chamber, or be placed into the piece goods chamber, respectively. Alternatively, but in particular additionally, it can moreover be provided that the free space is accessible in the horizontal direction from a space that is adjacent to the front side of the piece goods box. This simplifies the at least partial moving of the transfer device through the free space, specifically in the way that the transfer device which if required is fitted to a vehicle can move at least in a substantially vertical manner through the free space, either from bottom to top, or from top to bottom. The respective movement of the transfer device through the free space can moreover be implemented in a particularly simple manner as a pivoting movement. It can be sufficient herein for the part of the transfer device that is pivoted through the free space to be pivoted about at least one pivot axis. This moreover is particularly simple when the at least one pivot axis is aligned so as to be at least substantially horizontal.

Alternatively or additionally, the holder in terms of construction can be provided in a simple manner and be moreover readily handled when the holder at least in the transfer position is configured so as to be at least substantially U-shaped. In this way, the free space between the holding regions can also be readily implemented. The external legs of the U-shaped holder can be utilized as holding regions, for example. Depending on the alignment of the holder, these are in particular lateral holding regions of the holder. Alternatively or additionally, the transverse web of the holder that connects the external legs of the U-shaped holder can also be utilized as a holding region. This holding region in this instance can moreover form in particular a rear holding region. Each of these holding regions can then serve for reliably holding the at least one consignment, the tray, and/or the container.

When the holder is connected to the piece goods box so as to be displaceable by way of at least one rail system from the storage position to the transfer position and/or from the transfer position to the storage position, the respective readjustment of the holder can be implemented in a very simple and rather wear-resistant manner. Moreover, this design embodiment is preferred in terms of construction and costs. When a rail system is used, but not only in this instance, the holder can be provided so as to be displaceable at least in a substantially horizontal manner from the storage position to the transfer position and/or from the transfer position to the storage position, on account of which a reliable and space-saving readjustment of the holder when transferring and/or acquiring a piece goods item can be ensured.

In order for the transfer of at least one consignment from the transfer device to the holder and/or from the holder to the transfer device to be simplified and to simultaneously be able to be carried out in a reliable manner, the holder at least in the transfer position can be aligned so as to be at least substantially horizontal. The reliability of the transfer and an equalization of moderate deviations in terms of alignment between the holder and the transfer device can be fundamentally improved when the holder, in particular at least one holding region, has at least one incline that descends toward the free space. The consignment, the tray, and/or the container, when being transferred to the holder can then slide down on the at least one incline and can thus be positioned, if required also centered, in the desired manner.

In order for the consignment, the tray, and/or the container to have a wider bearing face on the mounting, for instance in order to avoid any undesirable bending of the consignment, of the tray, and/or of the container, a support structure for supporting the at least one consignment can be provided between the free space and the at least one incline, and below the at least one incline. The support structure herein for enlarging the bearing face preferably has a planar bearing face that in particular is at least substantially horizontal.

The transfer and/or the acquisition of piece goods is moreover simplified when the at least one piece goods item is supported by at least one tray and/or container, and the at least one tray and/or the at least one container in the direction of gravity are/is supported in form-fitting manner by the holder. Additionally, the tray and/or the container herein can bear on the at least one incline. In any case, by using a tray and/or a container for the piece goods handling, piece goods having very dissimilar dimensions can be transferred and/or acquired. An at least excessive standardization of the piece goods is not required in this instance. It can nevertheless however be expedient for the trays and/or the containers which are to be used in conjunction with specific holders to be standardized.

In order to not have to carry out any unnecessary method steps in the acquisition and/or transfer of piece goods, it can be expedient for the tray and/or the container to be releasably connected to the holder, in particular to the incline and/or the support structure. A permanent connection does not have to be established in this instance. A form-fitting connection, for example in the direction of gravity, can suffice in this instance. Alternatively or additionally, the consignment, the tray, and/or the container in at least one horizontal direction can be connected to the holder, in particular to the incline and/or the support structure, in a form-fitting manner, if required. It can be avoided in this instance, for example, that the consignment, the tray, and/or the container inadvertently slides from the holder.

In order to avoid any unauthorized access to a piece goods item in a piece goods chamber, the at least one piece goods chamber in the storage position of the at least one holder can have an access opening that is closed by a flap. Alternatively or additionally, the access would be simplified when the flap in the transfer position releases the access opening. The consignment can thus be readily removed from the piece goods chamber or readily be placed into the piece goods chamber, for example. Furthermore, the interaction with the holder for exchanging piece goods between the holder and a transfer device can be simplified when the at least one holder is at least in part readjustable through the access opening. For example, the holder in this instance can at least in part displaced through the access opening to the outside of the piece goods chamber. In order for the at least one consignment to be securely stored, the holder can then again in part be readjusted, if required displaced, through the access opening so as to be entirely in the piece goods chamber.

When the at least one flap is pivotably held on the piece goods box and is pivotably connected to the at least one holder, the opening of the access opening and the readjustment of the holder from the storage position to the transfer position and/or back can be coupled, specifically and optionally in a forced manner. The at least one flap in this manner can be readjusted from the closed position to the opened position and vice versa by readjusting the at least one holder from the storage position to the transfer position, for example. In this instance, only the readjustment of the holder or of the flap is required in order for both the flap as well as the holder to be readjusted. Alternatively or additionally, it can of course be provided that the readjustment of the at least one holder from the transfer position to the storage position causes the readjustment of the at least one flap from the opened position to the closed position, and vice versa. The readjustment of the at least one flap in terms of construction can be implemented in a fundamentally very simple manner when the flap is held so as to be pivotable on the piece goods box.

Independently of any potential coupling between the holder and the flap, it can be expedient for the at least one holder and/or the at least one rail system to be assigned a drive in order to readjust the holder from the storage position to the transfer position and/or from the transfer position to the storage position. In order to save space and to be able to ensure a defined and reliable readjustment, the use of at least one spindle drive or of a linear drive is expedient in this context. Alternatively or additionally, the at least one flap can be assigned a drive, in particular a spindle drive, for readjusting the at least one flap from the closed position to the opened position and/or from the opened position to the closed position. The same advantages are fundamentally implemented herein.

In terms of a method, it can be provided in the case of a first particularly preferred design embodiment that by readjusting of the holder from the storage position to the transfer position at least one flap is forcibly readjusted from a closed position that closes the access opening of the piece goods chamber to an opened position that releases the access opening. The pivoting of the flap herein represents a simple readjustment that is implementable in a reliable manner. Alternatively or additionally, by readjusting the holder from the transfer position to the storage position, at least one flap can of course also be forcibly readjusted, if required pivoted, from an opened position that releases the access opening of the piece goods chamber to a closed position that closes the access opening. An operation of the piece goods box that is simple in terms of construction and reliable is thus possible.

The handling of the piece goods becomes particularly comfortable when the at least one holder by way of a drive for readjusting the holder is driven from the storage position to the transfer position and/or is driven from the transfer position to the storage position. An activation of the holder, for example by hand, can thus be dispensed with if required. Alternatively or additionally, the at least one flap by way of a drive for readjusting the flap can also be driven from the closed position to the opened position and/or from the opened position to the closed position, this leading to the same advantages.

The readjustment of the holder in terms of a method can be accomplished without problems when the at least one holder is pulled out from the storage position to the transfer position, or in the opposite direction is pushed in, respectively, by way of a rail system. For an improved transfer of the piece goods item, the pulling-out herein is preferably performed at least in part from the piece goods chamber or from the piece goods box. In the opposite direction, the holder is then preferably pushed at least in part into the piece goods chamber or into the piece goods box. In order to ensure a reliable readjustment of the at least one consignment by the readjustment of the holder, it is expedient for the readjustment of the holder to the storage position and/or to the transfer position to be performed in an at least substantially horizontal manner.

In order to be able to readily handle piece goods having rather dissimilar dimensions, the at least one piece goods item, at least one tray supporting at least one piece goods item, and/or at least one container having at least one piece goods item can be transferred by the at least one transfer device to the at least one holder, and alternatively or additionally be acquired by the at least one transfer device from the at least one holder. The use in particular of at least one tray and/or at least one container herein permits the simple handling of piece goods having rather dissimilar dimensions. In this instance, the tray and/or the container which can support or have the at least one piece goods item can be primarily handled.

In terms of a method it can be provided that the at least one piece goods item, at least one tray supporting at least one piece goods item, and/or at least one container having at least one piece goods item, is deposited by the at least one transfer device onto at least one incline of the holder. The consignment, the tray, or the container can in this instance at least partially slide down the inclines, on account of which the consignment, the tray, and/or the container can be positioned and/or centered. Inaccuracies in terms of the alignment of the holder and the transfer device, for example, can be equalized in this way. This is achieved, if required, in that the at least one piece goods item, at least one tray supporting at least one piece goods item, and/or at least one container having at least one piece goods item, slides down the at least one incline at least partially in a self-acting manner.

BRIEF DESCRIPTION OF THE SEVERAL VIEWS OF THE DRAWING

The invention will be explained in more detail hereunder by means of a drawing showing merely an exemplary embodiment. In the drawing:

FIGS. 2A-D schematically shows a detail of the piece goods box from FIG. 1 in various positions when carrying out the method according to the invention, in perspective views and from the side;

FIGS. 3A-C schematically shows the detail of the piece goods box from FIG. 2 in various positions when carrying out the method according the invention while using a tray, in perspective views and from the side.

DETAILED DESCRIPTION OF THE INVENTION

Figure 1A:
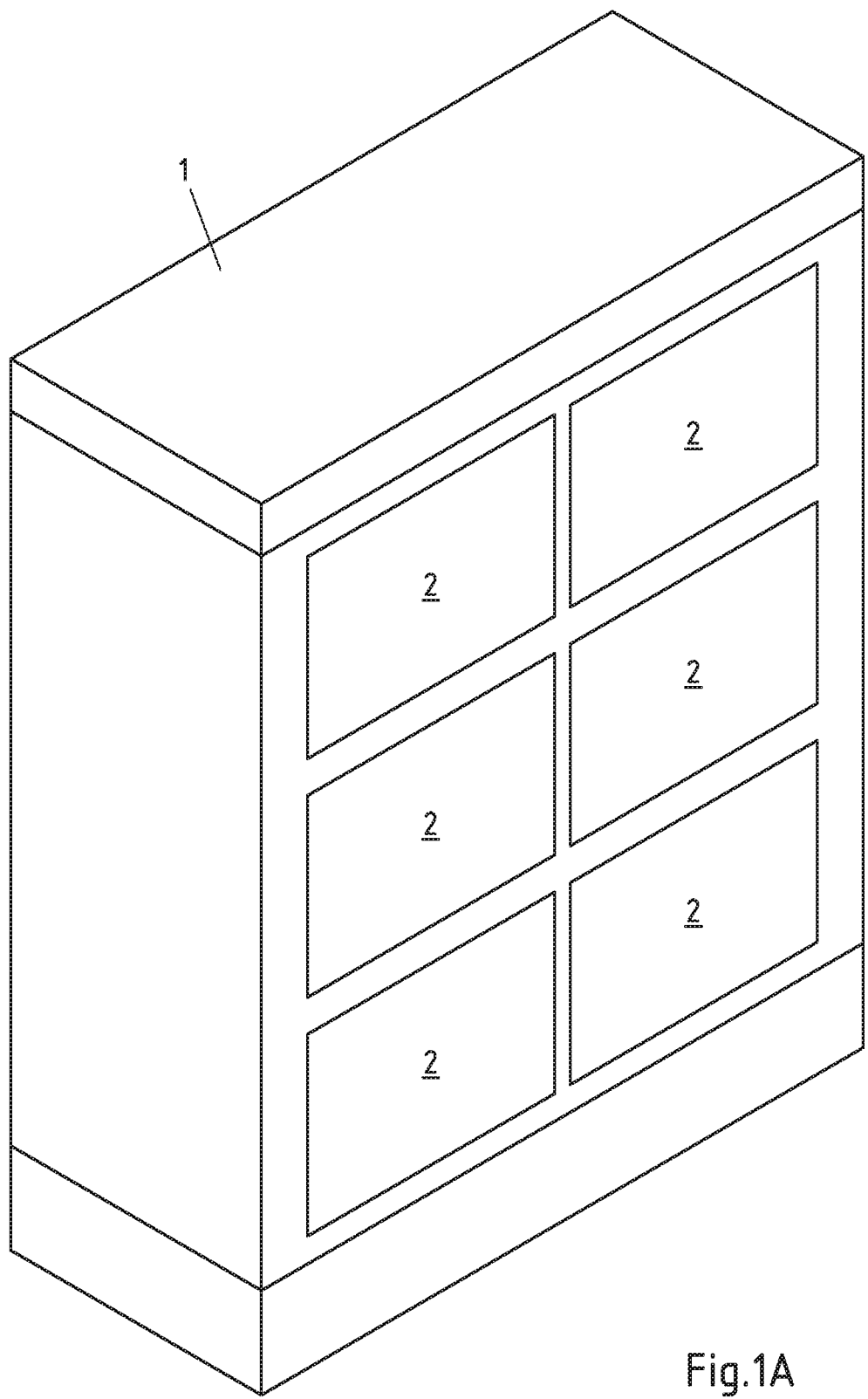
FIGS. 1A-C schematically shows a piece goods box according to the invention in various positions when carrying out the method according to the invention, in perspective views and from the side.
Figure 1B:
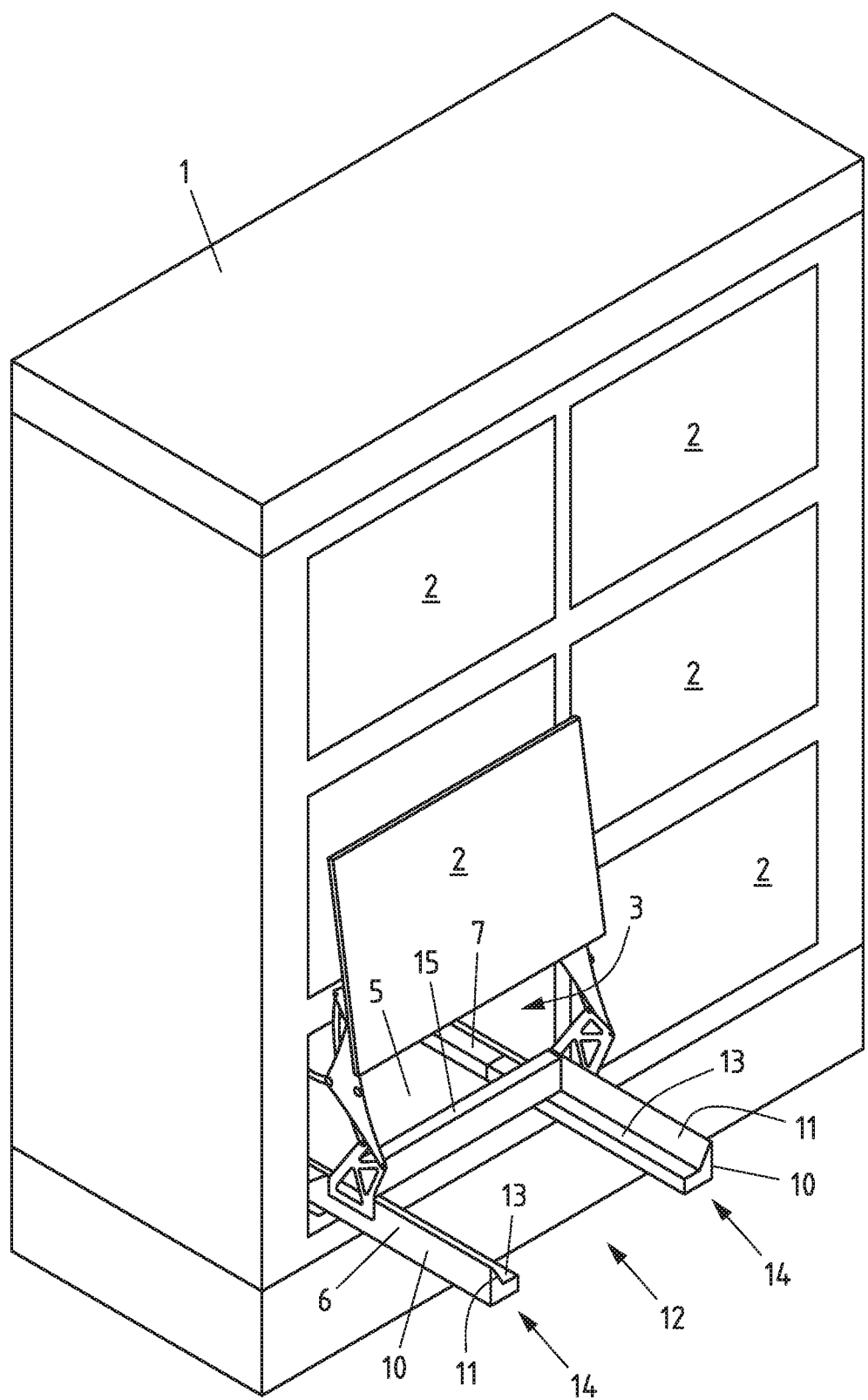
Figure 1C:
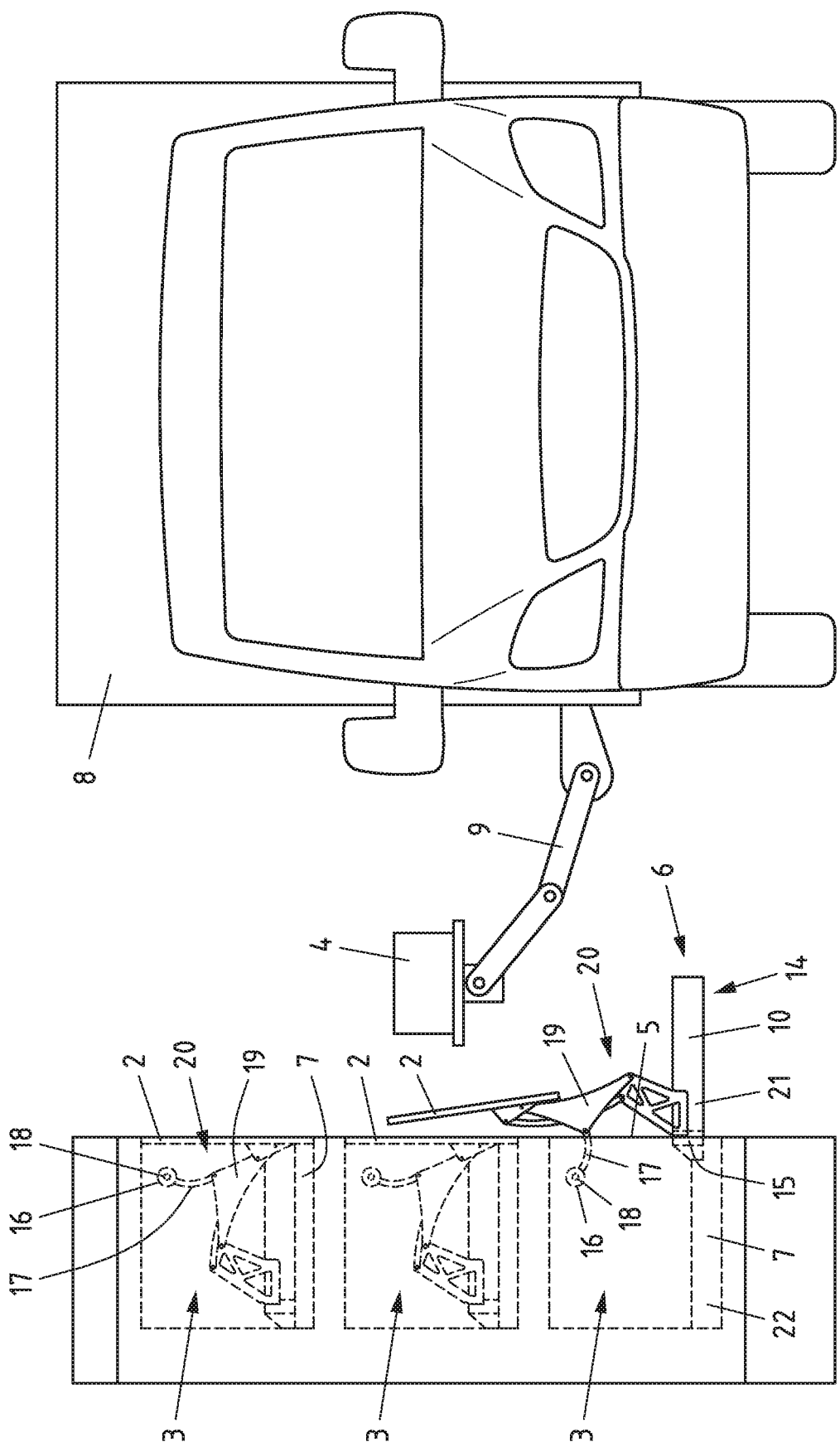

A piece goods box 1, preferably in the form of a consignment box, is illustrated in various positions in FIG. 1A-C, having a row of flaps 2, in each case one piece goods chamber 3, in particular in the form of a consignment chamber, for receiving and temporarily storing at least one piece goods item 4, in particular in the form of at least one consignment, being disposed behind said row of flaps 2. In order for a piece goods item 4 to be able to be placed into a piece goods chamber 3 or to be able to be removed from a piece goods chamber 3, the flaps 2 can be readjusted from the closed position illustrated in FIG. 1A to an opened position which is shown for one of the flaps 2 in FIG. 1B. In the closed position of a flap 2, the flap 2 closes an access opening 5 which enables the access to the associated piece goods chamber 3. In the opened position of the flap 2, the flap 2 releases the access opening 5 and thus the access to the associated piece goods chamber 3.

In the opened position of the one flap 2, illustrated in FIG. 1B, a holder 6 of the associated piece goods chamber 3 is moreover disposed in a transfer position at least partially outside the piece goods chamber 3, said holder 6 in the closed position of the flap 2 being disposed in a storage position in the piece goods box 1. The holder 6 herein is connected to the piece goods box 1 by way of a rail system 7, by way of which the holder 6 can be readjusted between the storage position and the transfer position, and in the opposite direction. As a result of the elongate rail system 7, the readjustment of the holder 6 is effected in the form a displacement of the holder 6.

The transfer of at least one piece goods item 4 to the at least one holder 6 in the transfer position is schematically illustrated in FIG. 1C. The transfer in the illustrated and to this extent preferred method is performed with the aid of a vehicle 8 which parks beside the piece goods box 1, and by means of a transfer device 9 which in the illustrated and to this extent preferred vehicle 8 is configured in the form of an arm. After the transfer, the transferred piece goods item 4 by way of the holder 6 can be pushed into the associated piece goods chamber 3, and the flap 2 can be closed in order for the piece goods item 4 to be temporarily stored in the piece goods chamber 3 and to be later dispensed again from the piece goods chamber 3. The vehicle can be driven by a driver or be driven in at least a partially autonomous manner. If required, said vehicle can also be an unmanned vehicle, for instance in the sense of a land drone.

Since the alignment of the vehicle 8 in relation to the piece goods box 1, in particular in relation to the respective holder 6 of a piece goods chamber 3, can only be performed with a certain degree of inaccuracy, the holder 6, as is illustrated in particular in FIG. 1B, on lateral holding regions 10 has inclines 11 which serve for positioning and, if required, centering the consignment 4 on the holder 6 in the transfer of the piece goods item 4 to the holder 6. The inclines 11 in the direction of a free space 12 between the holding regions 10 are adjoined by support structures 13 for supporting the at least one piece goods item 4, or for providing a sufficient bearing face, respectively. The holder overall is configured so as to be U-shaped, wherein a free space 12 is provided in the center between the lateral legs 14 and the transverse web 15 that connects the lateral legs 14. This free space 12 in the transfer position of the holder 6 is at least partially, in the case of the illustrated and to this extent preferred piece goods box 1 entirely, disposed outside in front of the piece goods chamber 3. The free space 12 in this position of the holder 6 fulfills an important function for the transfer of the piece goods item 4 to the holder 6 and for the acquisition of a piece goods item 4 from the holder 6. In FIG. 1C it is illustrated that the holder 6 and the flap 2 are interconnected and disposed so as to be mutually readjustable. While the holder 6 is connected to the piece goods box 1 by way of the rail system 7, the flap 2 is connected to the piece goods box 1 by way of a pivot joint 16 for pivoting a connection means 17 of the flap 2 about a pivot axis 18 that in relation to the piece goods box 1 is disposed in a locationally fixed manner. The connection between the flap 2 and the holder 6 in the case of the illustrated and to this extent preferred piece goods box 1 is implemented by way of a pivot fitting 19. This pivot fitting 19 herein configures a quadruple joint linkage 20 between the flap 2 and the holder 6 such that the flap 2 is configured so as to be pivotable in relation to the holder 6. Moreover, as a result of the rail system 7 that is coupled to the holder 6, the flap 6 is also displaceable, specifically conjointly with the holder 6.

Since the connection between the holder 6 and the associated flap 2 is configured so as to be permanent, a forced coupling between the holder 6, on the one hand, and the associated flap 2, on the other hand, is effected in such a manner that the readjustment of the holder 6 from the storage position in which said holder 6 is received in the piece goods box 1, to the transfer position in which said holder 6 is disposed at least partially outside the piece goods chamber 3, or outside the piece goods box 1, respectively, and in front of the associated flap 2 in the closed position, is performed conjointly with a pivoting of the flap 2 from the closed position that closes the access opening 5 to the piece goods chamber 3 to the opened position that releases the access opening 5 to the piece goods chamber 3. In a manner analogous thereto, the readjustment of the holder 6 from the transfer position back to the storage position is performed conjointly with the pivoting of the flap 2 from the opened position back to the closed position. The readjustment of the holder 6 is presently in particular a displacement in the longitudinal direction of the at least one rail system 7. The rail system 7 can comprise at least one rail 21 of the holder 6, and at least one rail 22 of the piece goods box 1, said rails 21 and 22 being connected so as to be capable of being pulled out and pushed in again in relation to one another.

Figure 2B:
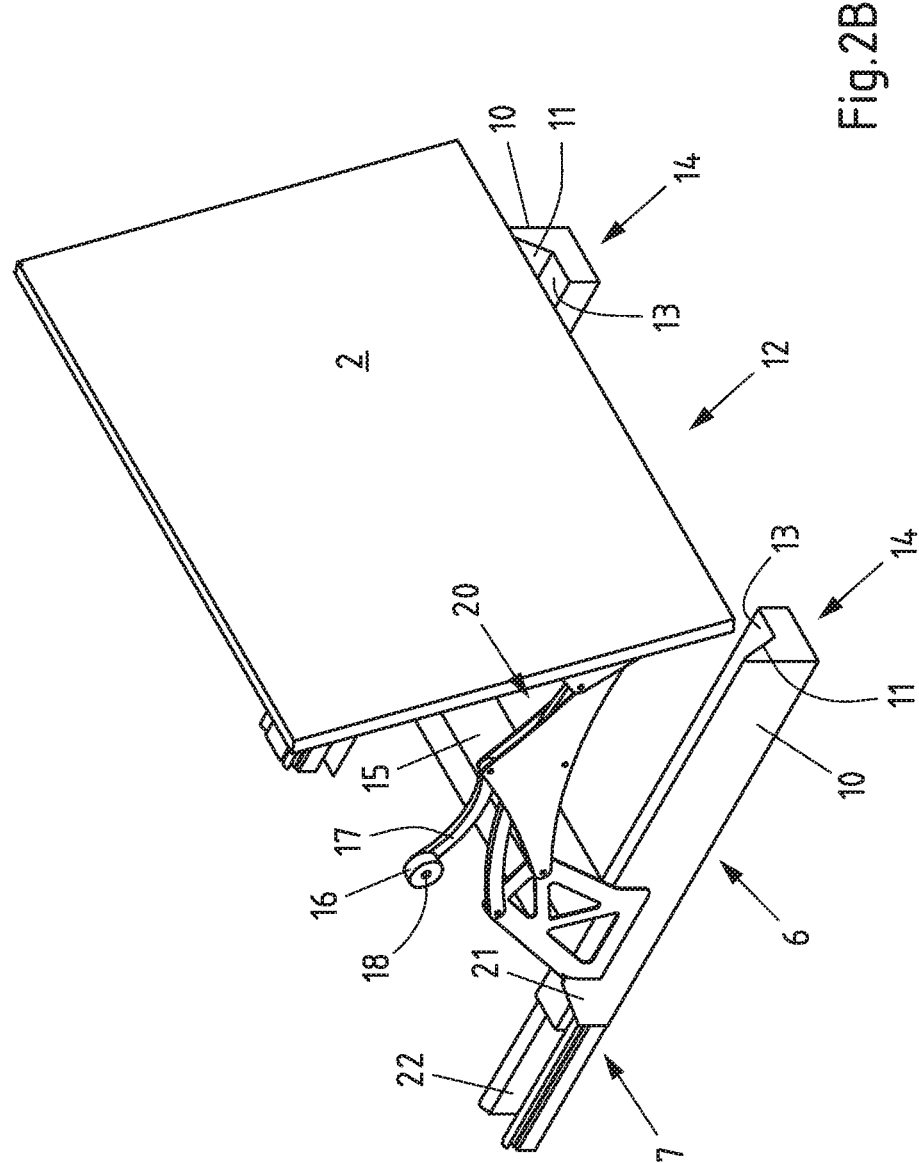

In FIGS. 2A-D a rail system 7, the holder 6, the flap 2, and the connection between the holder 6 and the flap 2 of a piece goods chamber 3 for the sake of clarity are shown separately. In FIG. 2A the holder 6 is illustrated in the storage position in which said holder 6 is disposed in the piece goods box 1. In this storage position of the holder 6, the flap 2 is disposed in the closed position. If the holder 6 is now displaced toward the front along the rail system 7 the flap 2 pivots upward and front so as to initially release the access opening 5 of the piece goods chamber 3 for the holder 6 which, as a result thereof, can at least partially slide through the access opening 5 toward the outside, as is illustrated in FIG. 2B. In a manner coupled to this movement of the holder 6, the flap 2 pivots further upward and toward the front, wherein the readjustment movement of the flap 2 by way of the quadruple joint linkage 20 in the connection between the flap 2 and the holder 6 is adapted precisely to the readjustment movement of the holder 6. The flap 2 herein, by way of the pivot fitting 19 and of the pivot joint 16, is secured to the locationally fixed pivot axis 18. Moreover, the rail system 7 for displacing the holder 6 in the case of the illustrated and to this extent preferred piece goods box 1 is equipped with a rail 22 that is secured in a locationally fixed manner to the piece goods box 1, and with a rail 21 which is provided in a locationally fixed manner with the holder 6 and is displaceable in relation to said rail 22.

Figure 2C:
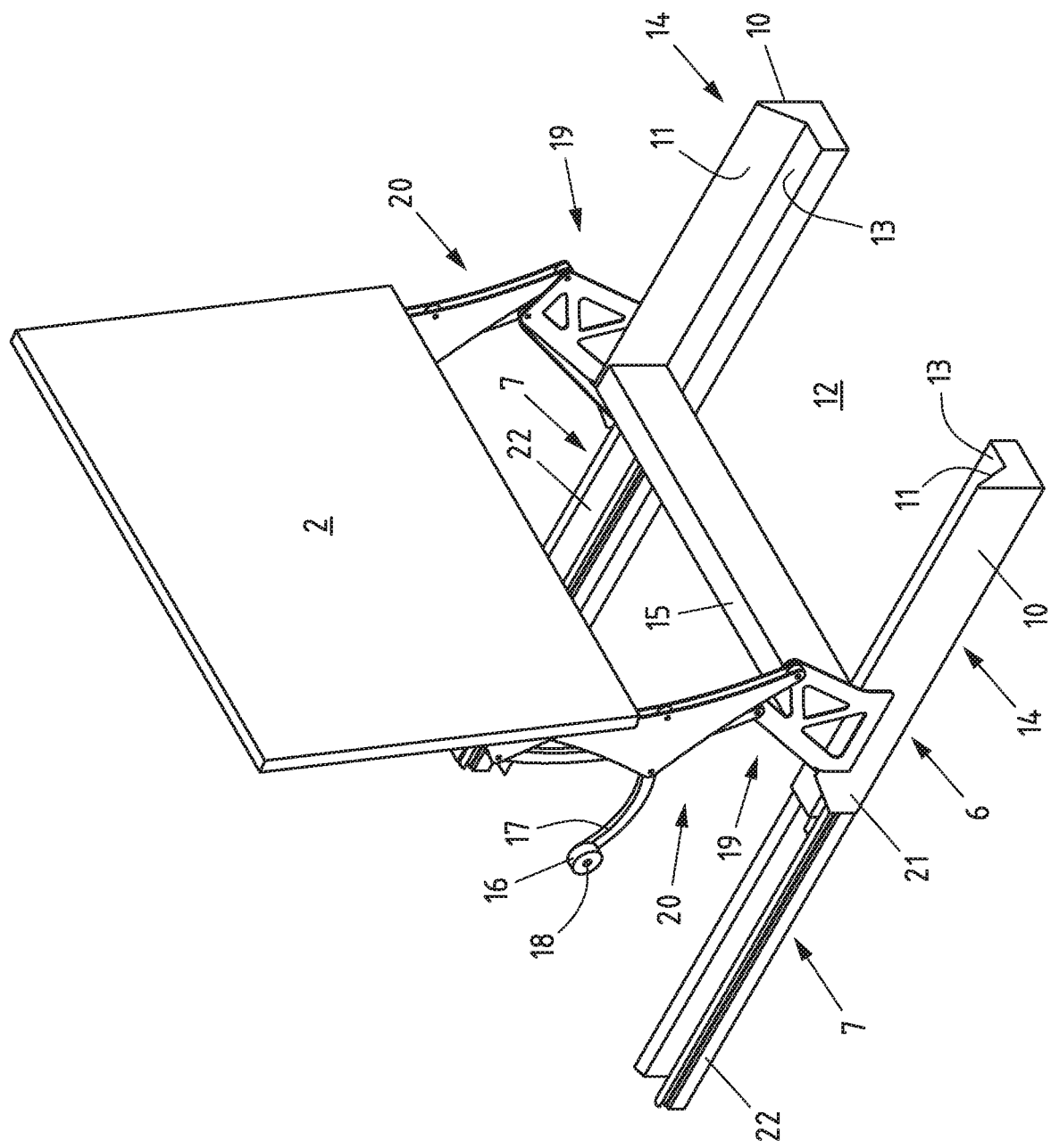

The holder 6 in FIG. 2C is completely deployed and disposed in the transfer position. Furthermore, the flap 2 is fully pivoted upward and disposed approximately above the rear end of the holder 2, or close to the front side of the piece goods box 1, respectively. The holder 6 is therefore highly accessible to a transfer device 9 for the transferring or acquiring of at least one piece goods item 4.

Figure 2D:
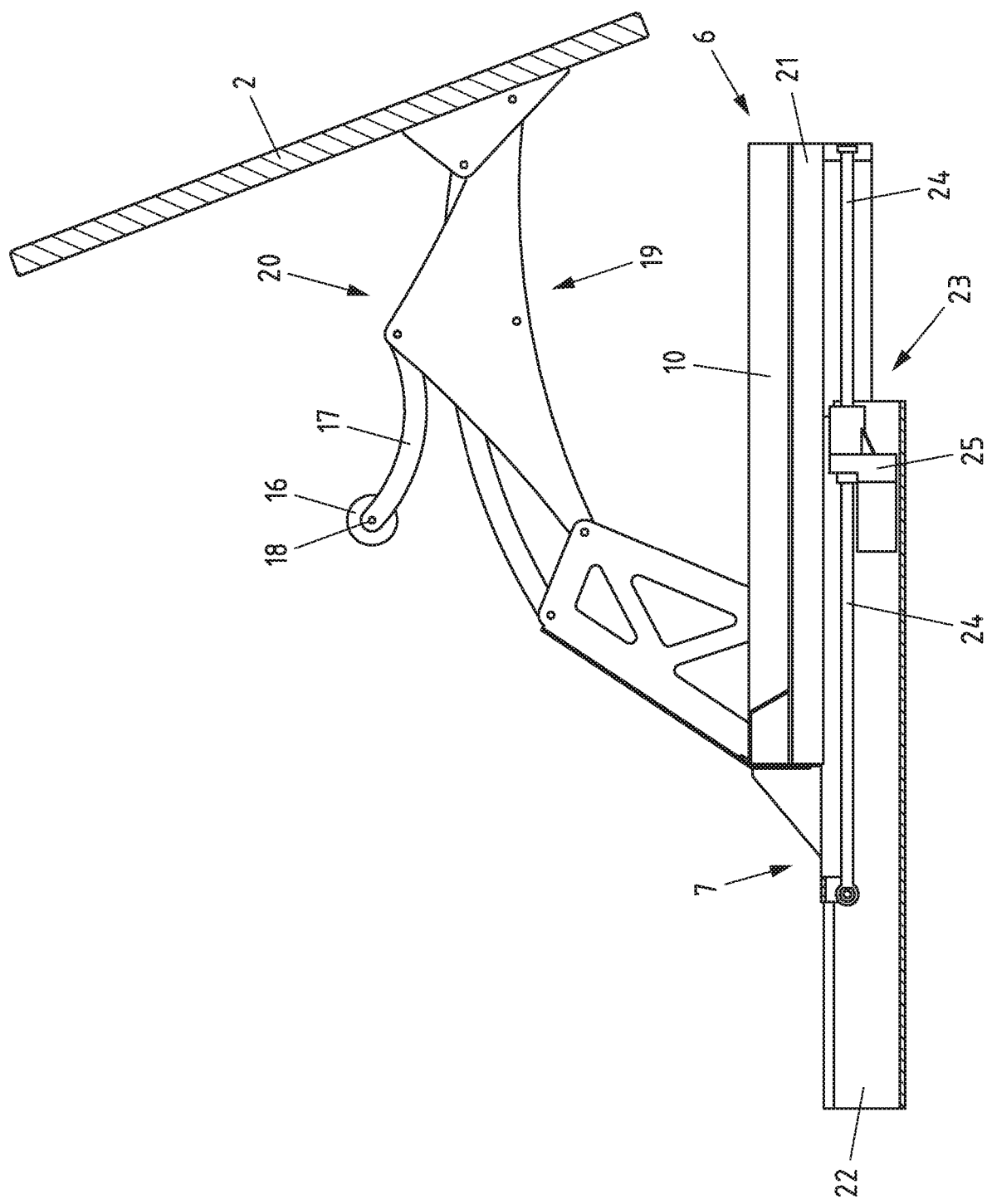

The drive for driving 23 the rail system 7 is illustrated in FIG. 2D. One drive 23 can be assigned to each side of the holder 6 herein. For reasons of cost, only one drive 23 is provided per holder 6 in the case of the illustrated and to this extent preferred piece goods box 1. The illustrated and to this extent preferred drive 23 is illustrated as a linear drive in the form of a spindle drive in which a threaded bar 24 can be driven out and be driven in again in relation to a drive housing 25, or can be repositioned in a reciprocal manner in the longitudinal direction of the rail system 7, respectively. If the threaded bar 24 is readjusted toward the right in FIG. 2D, the holder 6 is displaced toward the outside to the transfer position, while the holder 6 is displaced back toward the inside to the storage position, when the threaded bar 24 is displaced toward the left. The holder 6 in the position according to FIG. 2D is located between the storage position and the transfer position.

Figure 3A:
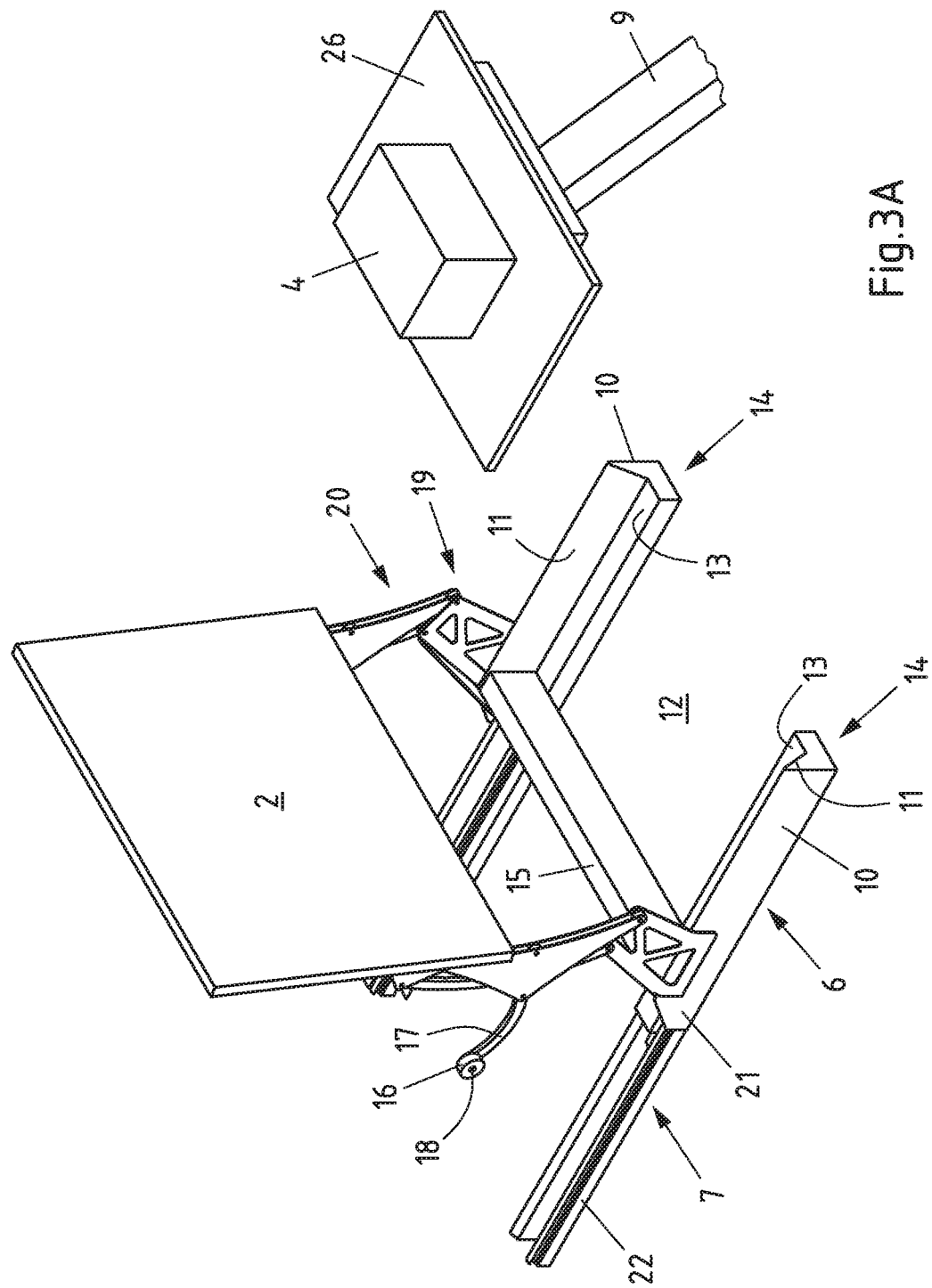
Figure 4:
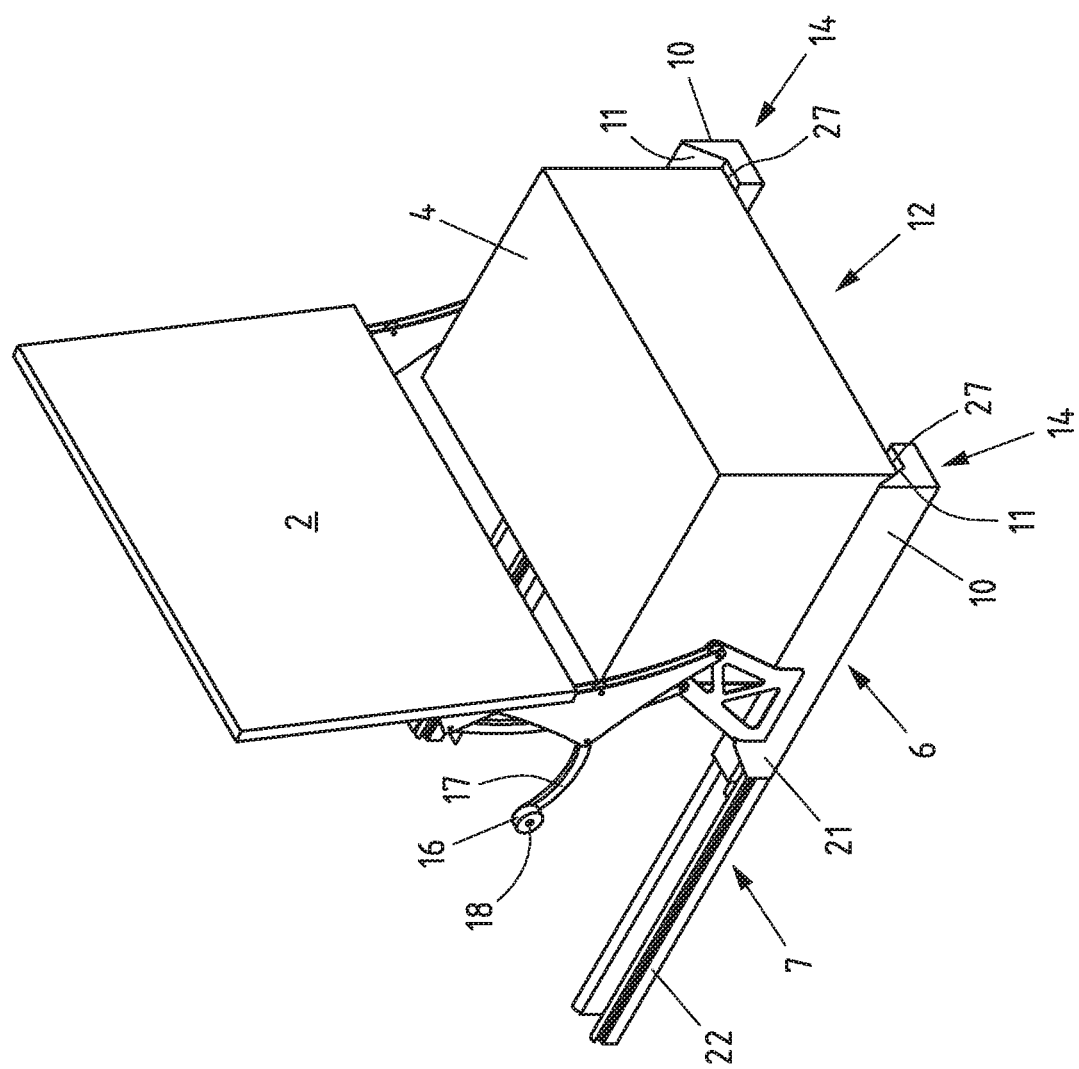
FIG. 4 shows the detail of the piece goods box from FIG. 2 in a perspective illustration in a position while carrying out the method according to the invention, while dispensing with a tray and a container, in a perspective view.

The method for transferring and/or acquiring piece goods 4, in particular in the form of consignments, can be explained by means of FIGS. 3A-C in which the holder 6 is in each case disposed in the transfer position, and the holder 6 forms a free space 12 between holding regions 10, said free space 12 being at least substantially disposed outside the piece goods chamber 3. This is important for the interaction between the holder 6 and a suitable transfer device 9.

The holder 6, illustrated in FIG. 3A and to this extent being the preferred holder 6, is configured so as to be U-shaped and has two lateral holding regions 10 which are formed by the lateral legs 14 of the holder 6, said lateral legs 14 in turn being interconnected by a rear transverse web 15. The illustrated and to this extent preferred holder 6 in the center thereof thus configures the free space 12. Furthermore, the holder 6 is displaced out of the piece goods chamber 3 and/or of the piece goods box 1 so far that the free space 12 is disposed at least partially, in particular entirely, in front of the piece goods chamber 3 and/or of the piece goods box 1. Moreover, the flap 2 that is positioned in the opened position, when viewed horizontally in the direction of the transverse web 15 or of the piece goods box 1, is disposed at least partially, in particular entirely, behind the free space 12. The free space 12 of the holder 6 is thus accessible to the transfer device 9 in order for piece goods 4 to be transferred.

In the case of the illustrated and to this extent preferred method the transfer device 9 supports a, preferably standardized, tray 26 on which a piece goods item 4 is located, said transfer device 9 as a result of the use of the tray 26 being able to have very different dimensions. The transfer device 9 which in the illustrated and to this extent preferred method is configured in the manner of an arm moves from top to bottom through the free space 12 that is defined by the holder 6. Said movement can be performed at least substantially in the vertical direction. However, this is not mandatory.

The position 4 illustrated in FIG. 3B in which the tray 26 bears on the holder 6 but is nevertheless still supported by the transfer device 9 is reached in this way. On the approach path of the tray 26 toward this position, the tray 26 can initially bear on at least one of the inclines 11, in any case if the tray 26 were to be aligned somewhat inaccurately in relation to the holder 6, and thereupon in the direction of gravity can slide down at least portions of the at least one incline 11. The tray 26 in the illustrated and to this extent preferred example thereupon comes to lie on support structures 13 which adjoin the inclines 11 in the direction of the free space 12. A wide bearing face 27 between the tray 26 and the holder 6 is thus provided. Moreover, a positioning and/or centering of the tray 26 and/or of the piece goods item 4 is achieved as a result of the inclines 11.

The transfer device 9 is subsequently moved further downward and away from the holder 6, as is illustrated in FIG. 3C, wherein the tray 26 however continues to be held on the holder 6, specifically in a form-fitting manner in the direction of gravity. As a result of the calibration between the tray 26 on the holder 6, one piece goods item 4 or a plurality of piece goods 4 can selectively be disposed on the tray 26. Very different dimensions of piece goods 4 are also possible, wherein the piece goods item 4 is preferably narrower and shorter than the tray 26. In order for the piece goods item 4 to be moved into the piece goods chamber 3 assigned to the holder 6, the holder 6 is displaced back to the storage position in the piece goods box 1.

In order for the piece goods item 4 to be offloaded to a transfer device 9 and thus to a vehicle 8, the holder 6 can again be readjusted from the storage position in which the flap 2 closes the access opening 5 of the piece goods chamber 3 to the transfer position in which the flap 2 is disposed in the opened position and releases the access opening 5 of the piece goods chamber 3. This is illustrated in FIG. 3C. To this end, a transfer device 9 can be moved, in particular pivoted, from below through the free space 12 of the holder 6, wherein the position according to FIG. 3B is established. The transfer device 9 engages below the tray 26, wherein the tray 26 however still bears on the holder 6. When the transfer device 9 is moved further upward the transfer device 9 lifts the tray 26 including the piece goods item 4 from the holder 6. The transfer device 9 can then convey the tray 26 including the piece goods item 4 into a vehicle 8, if required. The holder 6 without the tray 26 and without the piece goods item 4 stays behind in the transfer position illustrated in FIG. 3A. The holder 6 can subsequently be displaced back to the storage position and remain therein until a piece goods item 4, either with or without the tray 26, is again to be transferred to the associated piece goods chamber 3.

It is not shown in detail that a container can likewise be used instead of a tray 26, wherein the at least one piece goods item 4 is in this instance disposed in the container. The piece goods item 4 in this instance cannot readily slide off the tray 26. Since no other aspect of the method has to be modified in principle and a person skilled in the art instead of the tray 26 will be able to imagine a container having a piece goods item 4, the base area or the base, respectively, of the latter potentially having substantially the same dimensions in the plane of the holder 6, a separate illustration of the container is deemed to be dispensable.

A tray 26 or a container can also be entirely dispensed with, and only the consignment 4 per se be transferred to the holder 6. This is to be considered in particular when the dimensions of the piece goods item 4 are adapted to the holder 6 and to the respective free space 12. The piece goods item 4 should be configured so as to be wider than the free space 12 and narrower than the holder 6, for example. If required, a tray 26 or a container can additionally be used as described for a piece goods item 4 to which the aforementioned does not apply.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A piece goods box, comprising:
   at least one piece goods chamber for receiving at least one piece goods item, wherein the at least one piece goods chamber is assigned at least one holder that from a storage position for storing the at least one piece goods item in the piece goods chamber is adjustable to a transfer position, disposed at least partially outside the piece goods chamber, for transferring the piece goods item from the piece goods box and/or to the piece goods box, and wherein the holder at least in the transfer position has two lateral holding regions for holding at least indirectly the at least one piece goods item at least in the transfer position,
   wherein in the transfer position between the holding regions of the at least one holder at least one free space is provided that is accessible in the horizontal direction from outside the at least one piece goods chamber and that is disposed outside the piece goods chamber; and
   wherein the lateral holding regions comprise support structures for supporting the at least one piece goods item above the support structures both in the transfer position as well as in the storage position;
   wherein the at least one piece goods chamber in the storage position of the at least one holder has an access opening that is closed by a flap; and
   wherein the at least one flap is pivotably held in the at least one piece goods chamber and is pivotably connected to the at least one holder,
   wherein the flap in the transfer position releases the access opening and/or the at least one holder is provided so as to be at least in part re-adjustable through the access opening;
   wherein the at least one flap by readjusting the at least one holder from the storage position to the transfer position is adjustable to the opened position, and/or the at least one flap by adjusting the at least one holder from the transfer position to the storage position is re-adjustable to the closed position; and
   wherein the flag is pivoted upwards and forward in the opened position and downwards and back in the closed position, according to which an upper edge of the flap in the closed position equals the upper edge of the flap in the opened position, such that a front side of the flap is facing in front in the closed position as well as in the opened position and according to which in the opened position the flap is arranged horizontally viewed in the direction of the piece good box behind the free space.

2. The piece goods box according to claim 1, wherein the at least one free space is provided on a front side of the piece goods box and/or is accessible in the horizontal direction from a space that is adjacent to the front side of the piece goods box.

3. The piece goods box according to claim 1, wherein the holder at least in the transfer position is configured so as to be U-shaped and/or wherein external legs form the holding regions and/or a transverse web of the holder that connects the external legs forms a rear holding region.

4. The piece goods box according to claim 1, wherein the holder by way of at least one rail system is connected to the piece goods box so as to be displaceable from the storage position to the transfer position and/or from the transfer position to the storage position, and/or in that the holder is provided so as to be displaceable in an at least substantially horizontal manner from the storage position to the transfer position and/or from the transfer position to the storage position.

5. The piece goods box according to claim 1, wherein the holder at least in the transfer position is aligned so as to be at least substantially horizontal, and/or wherein the holder has at least one incline that descends toward the free space and between the free space and the at least one incline, and below the at least one incline, has a support structure for supporting the at least one piece goods item.

6. The piece goods box according to claim 5, wherein the at least one piece goods item is supported by at least one tray or container, and the at least one tray or the at least one container in the direction of gravity is supported in a form-fitting manner by the at least one incline of the holder and/or by the support structure, and wherein the tray or the container is releasably connected and/or in at least a horizontal direction, are/is connected in a formfitting manner to the at least one incline and/or to the support structure.

7. The piece goods box according to claim 1, wherein the at least one holder and/or the at least one rail system is assigned a drive for adjusting the holder from the storage position to the transfer position and/or from the transfer position to the storage position.

8. The piece goods box according to claim 7, wherein the drive is a spindle drive or a linear drive.

9. The piece goods box of claim 8, wherein the piece goods box is a consignment box.

10. A method for transferring and storing piece goods items in a piece goods box, according to claim 1,
    in which the at least one holder that is assigned to the at least one piece goods chamber is adjusted from the storage position for storing the at least one piece goods item in the piece goods chamber to the transfer position, disposed at least partially outside the piece goods chamber, for transferring the at least one piece goods item from the piece goods box and/or to the piece goods box;
    in which in the transfer position of the holder the at least one transfer device in an at least largely vertical movement is moved from outside the at least one piece goods chamber at least partially through the at least one free space between two lateral holder regions of the holder for at least holding indirectly the at least one piece goods item; and
    in which when moving the transfer device through the at least one free space of the holder the at least one piece goods item is transferred to the holder in the transfer position, and/or the at least one piece goods item is acquired by the holder in the transfer position.

11. The method according to claim 10,
    in which by adjusting the holder from the storage position to the transfer position at least one flap is forcibly readjusted, in particular pivoted, from a closed position that closes an access opening of the piece goods chamber to an opened position that releases the access opening and/or in which by adjusting the holder from the transfer position to the storage position at least one flap is forcibly adjusted, in particularly pivoted, from an opened position that releases the access opening of the piece goods chamber to a closed position that closes the access opening.

12. The method according to claim 10,
in which the at least one holder by way of a drive for adjusting the holder is driven from the storage position to the transfer position and/or is driven from the transfer position to the storage position, and/or in which the at least one flap by way of a drive for readjusting the flap is driven from the closed position to the opened position and/or from the opened position to the closed position.

13. The method according to claim 10,
in which the at least one holder by way of a rail system is pulled out, in particular in at least a substantially horizontal manner, from the storage position, in particular at least partially out of the piece goods chamber, to the transfer position, and/or in which the at least one holder by way of a rail system, in particular in at least a substantially horizontal manner, is pushed in from the transfer position to the storage position, in particular at least partially into the piece goods chamber.

14. The method according to claim 10,
in which the at least one piece goods item, at least one tray supporting at least one piece goods item, and/or at least one container having at least one piece goods item is transferred by the at least one transfer device to the at least one holder, and/or in which the at least one piece goods item, at least one tray supporting at least one piece goods item, and/or at least one container having the at least one piece goods item is taken over by the at least one transfer device from the at least one holder.

15. The method according to claim 10,
in which the at least one piece goods item, at least one tray supporting at least one piece goods item, and/or at least one container having at least one piece goods item is deposited by the at least one transfer device onto at least one incline of the holder, and in which the at least one piece goods item, at least one tray supporting at least one piece goods item, and/or at least one container having at least one piece goods item while being positioned centered, on the holder slides at least partially in a self-acting manner down the at least one incline.

* * * * *

UNITED STATES PATENT AND TRADEMARK OFFICE
CERTIFICATE OF CORRECTION

| | |
|---|---|
| PATENT NO. | : 11,772,891 B2 |
| APPLICATION NO. | : 15/937322 |
| DATED | : October 3, 2023 |
| INVENTOR(S) | : Felix Orth et al. |

It is certified that error appears in the above-identified patent and that said Letters Patent is hereby corrected as shown below:

In the Claims

Claim 1, Line 28 reads "nected to the at least one holder," and should read --nected to the at least one holder;--

Signed and Sealed this
Twenty-first Day of November, 2023

Katherine Kelly Vidal
*Director of the United States Patent and Trademark Office*